April 20, 1965    W. B. WEIS    3,179,346
APPARATUS FOR WINDING ELECTRIC STATORS
Filed April 19, 1962    2 Sheets-Sheet 1

Inventor
William B. Weis
by Roberts, Cushman & Grover
Attys

April 20, 1965 W. B. WEIS 3,179,346
APPARATUS FOR WINDING ELECTRIC STATORS
Filed April 19, 1962 2 Sheets-Sheet 2

United States Patent Office 3,179,346
Patented Apr. 20, 1965

3,179,346
APPARATUS FOR WINDING ELECTRIC STATORS
William B. Weis, 30 Hartsdale Ave., Hartsdale, N.Y.
Filed Apr. 19, 1962, Ser. No. 188,789
6 Claims. (Cl. 242—1.1)

This invention relates to winding stators and especially multi-pole stators of small size.

The development of electronic devices and systems, automation and the like, has brought about a demand for a large number of very small multi-pole motors. Such motors however are difficult to wind because of the close spacing of the poles of the stators and the fineness of the wire so that even though great care is exercised in winding, the finished stator is frequently found to be defective due to kinks and lack of uniformity. Moreover, such manual winding is tedious and extremely slow so that the ultimate cost of the motor is disproportionately high.

The principal objects of this invention are to provide semiautomatic winding apparatus by means of which small stators may be wound rapidly, accurately, efficiently and without defect. Other objects are to provide apparatus which is simple, durable, requires little power and is adapted, by substitution and/or adjustment of its component parts, to wind stators of different sizes and shapes and to place the winding about one pole or several poles according to specification.

As herein illustrated, the apparatus comprises, in combination, a support holding a stator having a plurality of closely spaced poles, the inner faces of which define a central opening therein, means supporting a needle with its axis coinciding with the axis of the central opening in the stator, an eye extending radially from the axis of the needle a distance intermediate the radial length of the poles from root to face, and means for effecting movement of the eye of the needle in one direction along the opening, between a pair of adjacent poles, to an end of the opening, across the ends of one or more poles, at that end, in the opposite direction, along the opening between another pair of poles to the end thereof, and across the end or ends of the poles to the point of origin.

The eye is in the form of a twist supported by spaced parallel legs adjustably fixed to the needle and is supplied with wire from a spool through the needle which is hollow and through a radially adjustable wire guide mounted on the needle.

There is means for effecting such circumferential winding of the pole or poles comprising a needle bar to which the needle is fixed, a sleeve mounted on the bar, opposed means yieldably constraining movement of the sleeve in either direction relative to the axis of the bar, and means connecting the sleeve to an eccentric for converting the rotary motion of the eccentric to reciprocation and oscillation of the sleeve and hence of the needle bar along its axis and about its axis. A guide bar and a pair of stops fixed to the needle bar, so as to have contact with opposite sides of the guide bar, limit oscillation of the needle bar in either direction. The eccentric is adjustable to adjust both the stroke and the oscillation of the needle bar.

The invention will now be described in greater detail with reference to the accompanying drawings wherein.

Figure 1:
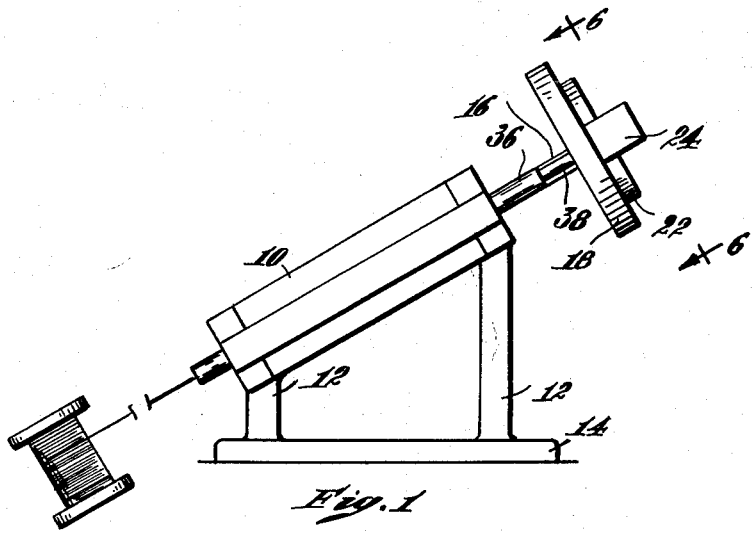
FIG. 1 is an elevation of the apparatus as seen from one side.
Figure 2:
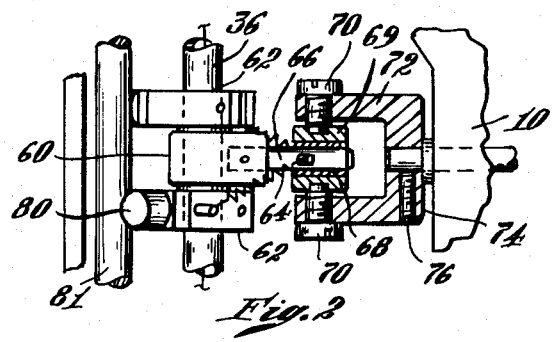
FIG. 2 is a fragmentary plan view of the drive for the needle bar.
Figure 3:
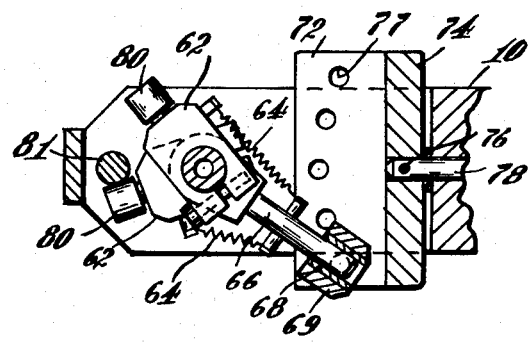
FIG. 3 is a fragmentary elevation of the drive for the needle bar.

Referring to the drawings (FIGS. 1 and 4), the apparatus comprises a rigid, substantially rectangular frame 10 supported in an inclined position by legs 12 on a base 14. A pair of spaced parallel rods 16—16, fixed to the upper end of the frame 10, support a holding plate 18 in a rearwardly inclined position, as seen from the right hand end of FIG. 1, in a convenient position for an operator using the machine. The holder 18 contains a circular opening 20 within which is seated an index ring 22 containing peripherally disposed index openings 23. A block 24 fastened to the holder, with a position overlying the index ring, contains a spring-pressed ball 26 for engagement with the openings 23 to hold the ring in a given position and to enable indexing through regular intervals. The index ring 22 contains a central opening in which is inserted an adapter 28 for holding a stator 30. A latch 31, pivoted to the index ring, provides for holding the adapter in place.

Figure 7:
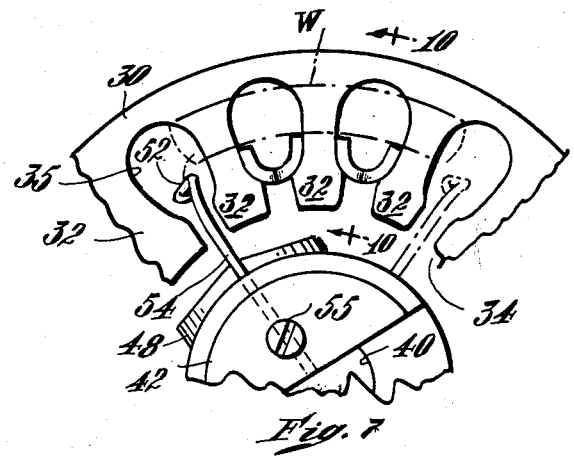
FIG. 7 is a fragmentary plan view of a stator drawn to much larger scale, showing a portion of the needle bar and the needle eye situated between a pair of adjacent poles.
Figure 5:
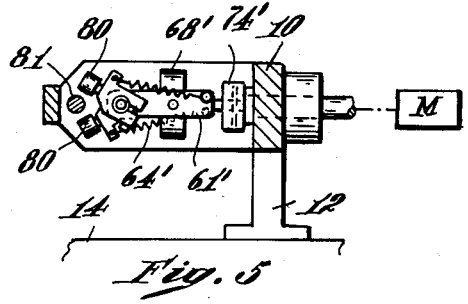
FIG. 5 is a section taken on the line 5—5 of FIG. 4.
Figure 10:
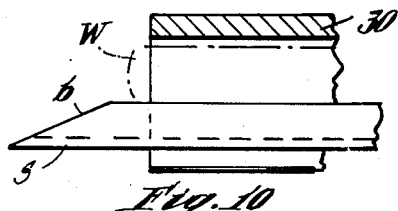
FIG. 10 is a section taken on the line 10—10 of FIG. 7.
Figure 12:
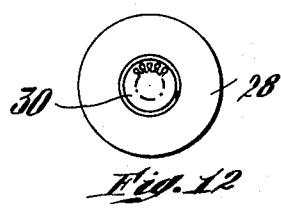
FIG. 12 is a plan view of the adapter ring removed from the index table supporting an unwound stator centrally thereof.

The stator, as shown in FIG. 7, has a plurality of closely spaced poles 32, the inner faces of which are concentric with the axis of the stator and define a central opening 34 through the stator. The interpole spaces 35 which extend radially outward from the opening 34 are relatively narrow and their outer ends terminate substantially tangent to the root circle of the poles.

Figures 8, 9:
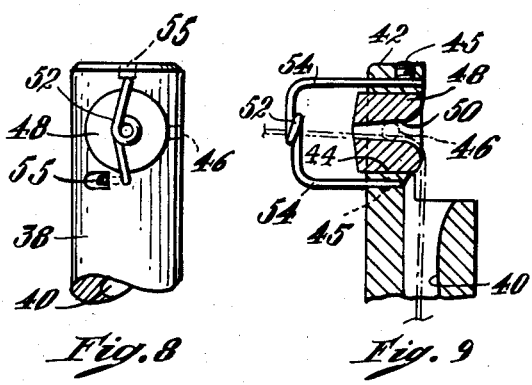
FIG. 8 is an elevation of the upper portion of the needle showing the eye of the needle.
FIG. 9 is a diametrical section of the needle bar showing the eye in elevation.
Figure 6:
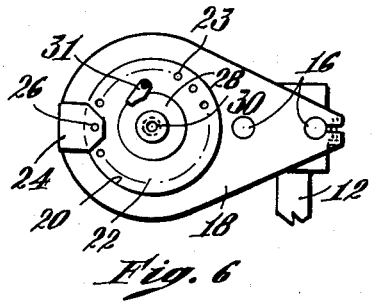
FIG. 6 is a view taken on the line 6—6 of FIG. 1.

A needle bar 36 is supported in the frame 10 with its axis coinciding with the center of the opening in the index ring 22 and has at its upper end a socket for receiving a needle 38, so that the latter extends upwardly through the opening 34 in the stator supported in the index ring. The needle 38 has an axial passage 40 through it and, at its upper end, is cut away so as to leave a post 42 (FIG. 9). The post contains a radially disposed opening 44 and a wire guide 48 of a circular cross-section, containing a centrally disposed, inwardly flaring throat 50, is disposed in the opening 44 and adjustably held therein by a set screw 46. The needle eye 52 is comprised of a twist of fine wire provided with spaced parallel legs 54—54, the distal ends of which are mounted in radial openings 45—45 formed in the post 42 at opposite sides of the wire guide in a plane containing the axis of the needle so that the plane of the legs contains the axis of the needle. The plane of the twist is perpendicular to a radius from the needle and is in radial alignment with the throat of the wire guide. The legs 54—54 are adjustably fixed to the pole by set screws 55—55. By adjustment of the legs 54—54 the eye can be positioned at any radial distance from the axis of the needle between the root circle of the poles and the circle defined by the faces of the poles.

As herein illustrated, the needle eye 52 and its supporting legs 54—54 are made of very fine hard wire, the legs 54—54 being located one above the other in a common plane so that they can pass easily through the interpole spaces 35 even though their spaces are very small particularly at their inner ends adjacent the faces of the poles. In small motors the interpole spaces are in the order of 1/10 of an inch.

Figure 11:
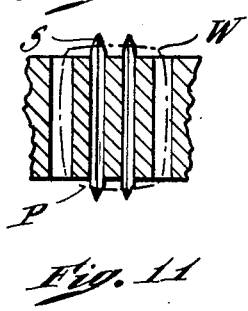
FIG. 11 is a fragmentary section drawn diagrammatically, illustrating the path of the eye of the needle in making windings about three poles.

A very fine wire is employed for winding these poles and while one pole may be wound at a time, it is customary to make a winding w about two or more poles, as shown, for example, in FIGS. 7 and 11, in which the winding is made about three poles. Diagrammatically, for the purpose of illustration, only, the path of movement of the needle eye for winding three poles is shown in FIG. 11, by the dot and dash line p, as comprising a movement axially of the stator in one direction through the space 35 between a pair of poles, across the ends of three poles, in the opposite direction through the space between another pair of adjacent poles, then across the ends of the three poles to the point of origin.

In order to dispose the wire in a compact coil, guide shoes S are mounted in the spaces between poles which are to be included by the winding. These shoes comprise U-shaped strips of flexible material, for example plastic, cardboard, or the like, having beveled end portions b which face outwardly with respect to the axis of the stator so that as the wire is carried across their ends it will slide down the beveled surface into a position outwardly of it. The shoes are sufficiently elastic so that their U-shaped legs, by frictional engagement with the walls of the opening, yieldably hold them in place, as shown in FIG. 7. After winding the shoes may easily be removed.

Movement of the needle to effect the winding described above is provided by reciprocating the bar 36 and at each end of its reciprocable movement oscillating it, first in one direction and then in the other. Preferably this motion is obtained by mounting a sleeve 60 on the bar 36 between a pair of axially spaced collars 62—62 which are clamped to the bar 36 so as to prevent axial movement of the sleeve 60 but to permit the sleeve to turn on the bar 36. A rod 66 is threaded at one end into the sleeve 60 and opposed springs 64—64 are fastened at one end to the opposite sides of the rod 66 and at their other ends to the collars 62—62 so as to hold the rod 66 in balanced equilibrium. The rod 66 slidably engages a bushing 68, fixed in an annular block 69. The block 69 is mounted between diametrically disposed pins 70—70 fixed between the spaced parallel arms 72—72 of a clevis block 74. The clevis block 74 is secured to a shaft 78 by a set screw 76. The arms of the clevis block contain aligned holes 77—77 whose centers lie along a flat curve. The pins 70 are removably engageable with the holes and provide means for adjustably supporting the annular block 69 on the clevis.

The motion obtained with the foregoing mechanism would describe an elliptical path which would be allowable for a stator in which the spaces between poles were relatively large and, in fact, if the apparatus is used for multi-pole stators of large size, will effect movement of the needle eye through the spaces between poles satisfactorily. When the spaces between poles are very narrow the elliptical motion of the needle eye along the sides of the ellipse cannot be tolerated since the eye would be forced against the sides of the pole pieces and thus be broken or damaged. It is desirable therefore to straighten the motion of the eye along the long sides of the ellipse and to this end a guide bar 81 is mounted on the frame parallel to the bar 36 and cam rolls 80—80 are fixed to the collars 62—62 so as to be opposite the sides of the guide bar. The cam rolls will limit the oscillation of the bar 36 even though the sleeve may be oscillated a greater amount due to the fact that the sleeve is rotatable on the bar. By adjusting the angular spacing of the collars the amplitude of oscillation may be correspondingly adjusted and the travel along the long side of the ellipse straightened out so that there is no danger of the eye being pressed against the sides of the poles. The stroke of the reciprocation may be adjusted by adjusting the position of the block 69 on the clevis and by adjusting the axial position of the clevis on the shaft 78.

Figure 4:
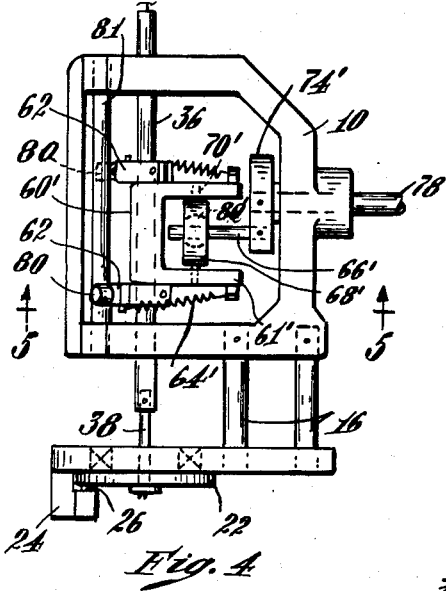
FIG. 4 is a plan view of an alternative drive for the needle bar.

FIG. 4 shows a modified form of drive in which a sleeve 60' having spaced parallel radial arms 61'—61' is mounted on the bar 36 between the collars 62—62. A ring 68' is pivotally mounted on pins 70'—70' between the arms 61'—61'. The ring 68' supports a ball 80 which slidably receives one end of a pin 66', the other end of which is fixed eccentrically to a disc 74'. The disc 74' is fastened to the shaft 78. As in the previously described form of the invention, a guide rod 81 is provided on the frame and the follower cams 80 are fastened to the collars 62 so as to have engagement with the rod 81 at its opposite sides. Springs 64'—64' hold the sleeve 60' in equilibrium.

The apparatus is driven by a suitable motor M which is provided with a switch (not shown) for turning it off after a predetermined number of loops have been made. This may be done by means of a counter.

The device has the advantages of extreme accuracy, of being able to wind very fine wire about the poles of very small multi-pole motors and of drawing the wire directly from a spool of wire without danger of kinking which is one of the difficulties encountered in manual handling of the wire which so frequently results in defective stators.

It should be understood that the present disclosure is for the purpose of illustration only and that this invention includes all modifications and equivalents which fall within the scope of the appended claims.

I claim:

1. In an apparatus for winding the poles of a multi-pole stator having a central opening defined by the inner faces of the poles and interpole spaces extending radially outwardly therefrom, a rigid needle bar supported with its axis coinciding with that of the stator, for linear and oscillatory movement, an eye, means supporting the eye on the needle bar in a radial plane at a distance from the axis of the bar intermediate the outer ends of the interpole spaces and the inner faces of the poles, characterized in that said means supporting the eye is elastically flexible relative to the rigid needle bar.

2. In an apparatus for winding the poles of a multi-pole stator having a central opening defined by the inner faces of the poles and interpole spaces extending radially outward therefrom, a rigid needle bar supported with its axis coinciding with that of the stator, for linear and oscillatory movement, an elastically flexible, resilient support fixed at its proximal end to the needle bar so as to extend radially outwardly therefrom, and an eye at the distal end of the support, supported thereby intermediate the outer ends of the interpole spaces and the inner faces of the poles.

3. In an apparatus for winding the poles of a multi-pole stator having a central opening defined by the inner faces of the poles and interpole spaces extending radially outward therefrom, a rigid needle bar supported with its axis coinciding with that of the stator, for linear and oscillatory movement, slender, flexibly resilient, radially disposed arms fixed at their proximal ends to the bar, and an eye connected to the distal ends of the arms, said arms supporting said eye intermediate the outer ends of the interpole spaces and the inner faces of the poles.

4. In an apparatus for winding the poles of a multi-pole stator having a central opening defined by the inner faces of the poles and interpole spaces extending radially outward therefrom comprising a rigid needle bar, means supporting the needle bar with its axis coinciding with that of the stator, for linear and oscillatory movement, said needle bar containing a radial aperture for passage of the wire therefrom, an eye, and means supporting the eye on the needle bar intermediate the outer ends of the interpole spaces and the inner faces of the poles opposite the aperture, said means comprising slender, flexible, radially disposed axially spaced arms fixed at their proximal ends at diametrically opposed sides of the aperture and having at their distal ends portions connected to the eye.

5. Apparatus according to claim 4, comprising set screws removably fixing the proximal ends of the arms to the needle bar.

6. In an apparatus for winding the poles of a multipole stator having a central opening defined by the inner faces of the poles and interpole spaces extending radially outwardly therefrom, a rigid needle bar, means supporting the needle bar with its axis coinciding with that of the stator, for linear and oscillatory movement, and an eye supported on the needle bar at a radial distance from the axis thereof intermediate the outer ends of the interpole spaces and the inner faces of the poles, said eye and its support comprising a single length of spring wire twisted intermediate its ends to form a circular eye and bent at points spaced diametrically of the eye at right angles to the plane of the eye to provide spaced parallel legs, the proximal ends of which are adapted to be secured to the needle bar.

References Cited by the Examiner
UNITED STATES PATENTS

| 2,791,121 | 5/57 | Morrill | 242—1.1 |
| 2,934,280 | 4/60 | Mason | 242—1.1 |
| 3,025,008 | 3/62 | Nill et al. | 242—1.1 |

FOREIGN PATENTS

| 1,228,493 | 3/60 | France. |
| 311,380 | 1/56 | Switzerland. |

MERVIN STEIN, *Primary Examiner.*

HARRISON R. MOSELEY, *Examiner.*